United States Patent [19]

Farr

[11] 4,095,922

[45] Jun. 20, 1978

[54] ELECTRO-MECHANICAL DEVICE

[75] Inventor: James B. Farr, Ann Arbor, Mich.

[73] Assignee: Tecumseh Products Company, Tecumseh, Mich.

[21] Appl. No.: 734,116

[22] Filed: Oct. 20, 1976

[51] Int. Cl.² .......................................... F04B 21/00
[52] U.S. Cl. ...................................... 417/313; 62/323; 123/198 R; 310/74; 310/153; 417/319; 417/411
[58] Field of Search ................ 417/313, 269, 270, 273, 417/319, 362, 374, 411; 192/113 A; 62/323; 310/74, 153; 123/149 R, 149 A, 195 A, 198 R

[56] References Cited

U.S. PATENT DOCUMENTS

| 1,422,995 | 7/1922 | Link | 123/195 A |
|---|---|---|---|
| 1,672,191 | 6/1928 | Anderson et al. | 123/195 A |
| 2,002,230 | 5/1935 | Wright | 123/195 A |
| 2,070,615 | 2/1937 | Plante | 123/195 A |
| 2,079,724 | 5/1937 | Ranst | 123/195 A |
| 2,465,436 | 3/1949 | Eckert | 123/198 R X |
| 2,674,356 | 4/1954 | Eason | 192/113 A X |
| 3,082,933 | 3/1963 | Bernard | 417/319 |
| 3,663,850 | 5/1972 | Phelon | 310/153 |
| 3,778,651 | 12/1973 | Cone | 310/74 |
| 3,828,212 | 8/1974 | Harkness et al. | 310/153 |

Primary Examiner—William L. Freeh
Assistant Examiner—Edward Look
Attorney, Agent, or Firm—Albert L. Jeffers; Roger M. Rickert

[57] ABSTRACT

A pump such as a vehicle air conditioner compressor has a compressor shaft, a continuously engine-driven flywheel and means such as an electromagnetic clutch for selectively coupling the flywheel to the shaft to operate the pump. The flywheel also provides a permanent magnet field which field rotates with the flywheel and induces in the windings of a relatively stationary annular stator assembly an electric voltage in response to the rotating magnetic field. The pump shaft, annular clutch actuating coil, annular stator assembly, and permanent magnet flywheel are all generally concentrically disposed and in the order stated. The flywheel is driven any time that the engine is running thereby inducing a voltage in the stator windings and that flywheel also drives the exemplary compressor when the clutch is actuated.

11 Claims, 5 Drawing Figures

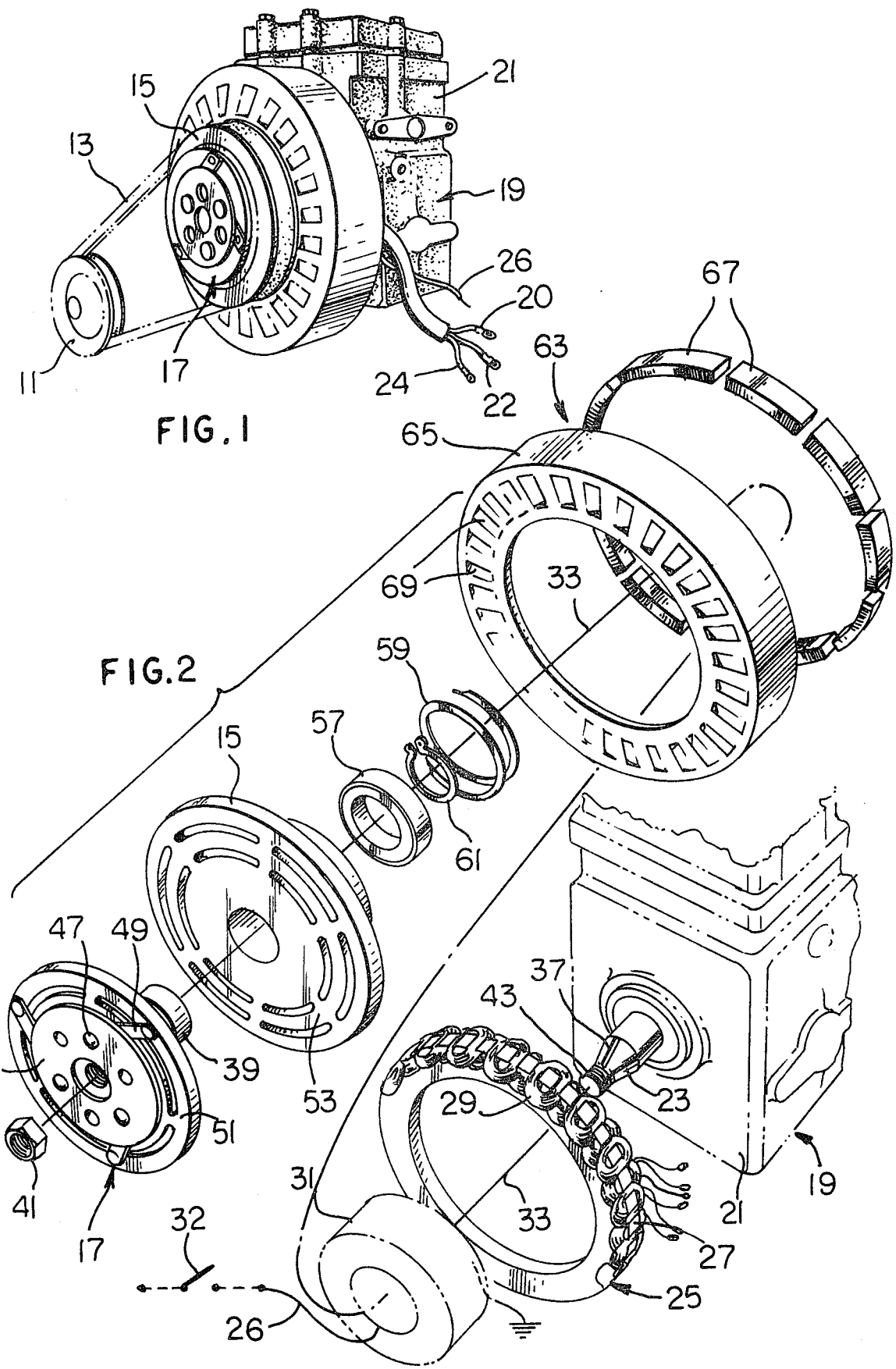

ELECTRO-MECHANICAL DEVICE

CROSS-REFERENCE TO RELATED APPLICATIONS

This application is related to my copending application Ser. No. 734,117, filed on even date herewith for "Short Pitch Alternator", assigned to the assignee of the present invention and the entire disclosure of which is specifically incorporated herein by reference.

BACKGROUND OF THE INVENTION

The present invention relates generally to a multipurpose electromechanical device which provides a pumping function such as might be required in an air conditioning system as well as an electrical energy generating function to obviate the need for, for example, a separatively driven vehicle alternator.

In the past, vehicles have included a prime mover, such as an internal combustion engine, which in addition to supplying energy to drive the vehicle, also provides energy to a number of other devices through a maze of V-belts, pulleys and the like. Specifically, such an engine drives an electrical generator or alternator, a water pump, a power steering pump, an air conditioner pump or compressor, various anti-pollution devices and perhaps other devices.

The typical alternator will be engine-driven by way of a V-belt and a relatively small diameter pulley, for example, of the order of 2-½ inches in diameter. The alternator typically therefor revolves at a relatively high speed generating a relatively high frequency alternating current voltage. With such a relatively high frequency alternating current voltage, stator core losses are relatively high and with such a small diameter pulley, belt slippage is a substantial problem. From at least a size standpoint, larger pulleys and lower frequencies have heretofore not been practical.

Compressors for vehicle air conditioning systems are typically also belt-driven from the engine by way of a pulley, which is selectively coupled to the compressor shaft by an electromagnetic clutch arrangement. Much of the time this electromagnetic clutch is not actuated and the compressor pulley and V-belt are "free wheeling", contributing nothing to the system except frictional losses. As compared to an alternator, the current compressor design is of a lesser number of revolutions per minute, greater pulley diameter (a six inch diameter pulley would not be uncommon) and a somewhat larger overall structure. The larger pulley diameter and slower speed reduces belt slippage and related problems.

It is also known in the prior art, for example, in U.S. Pat. No. 2,660,865 to provide a common shaft for a pump and an electrical generator, however, such prior art approaches amounted to little more than placing the two machines end to end with the overall axial length, weight and cost being substantially the sum of those traits for the respective individual components.

SUMMARY OF THE INVENTION

Among the several objects of the present invention may be noted the provision of a single electromechanical device which will supplant the typical vehicle generator and pump; the provision of a space, weight and cost saving arrangement wherein an alternator rotor is rotatably supported on the bearings required for a pump and the stator assembly is supported on the pump housing; the provision of an alternator function of reduced frictional and eddy current losses as compared to the above-mentioned alternator systems; and the provision of an electromechanical device which provides an alternator function while lessening the noise associated with prior art alternators due to belt slippage and high speed of operation or rapid acceleration.

In general, a combined pump and generator arrangment according to the present invention includes a pump housing with an axially extending actuating shaft, a rotatable member to be driven, for example, by a vehicle engine to rotate about the actuating shaft axis, a magnetic field arrangement on the rotatable member to provide a rotating magnetic field when that member is driven, and an annular stator assembly fastened to the pump housing and having windings for providing an electrical voltage in response to the rotating magnetic field. In the preferred form, the actuating shaft and annular stator assembly are concentrically disposed with the annular stator assembly lying intermediate or between the actuating shaft and the permanent magnet arrangement. A clutch may be provided selectively to couple and uncouple the rotatable member and the pump shaft; however, the generator is operative regardless of whether the clutch is engaged or not. A generator integral with, yet operating independently of, a pump may thereby by provided.

Also in general, and in one form of the invention, a vehicle air conditioner compressor has a compressor shaft, a continuously driven flywheel which is selectively coupleable to the shaft to operate the compressor, and is capable of generating electrical energy in response to the flywheel rotation due to the provision of a permanent magnet field which rotates with the flywheel, and a relatively stationary annular stator assembly having windings for providing the electric voltage in response to the rotating magnetic field.

BRIEF DESCRIPTION OF THE DRAWINGS

FIG. 1 is a perspective view of an electromechanical device which embodies the present invention in one preferred form;

FIG. 2 is an exploded perspective view of the electromechanical device of FIG. 1;

In the several drawing views like reference numerals identify like parts. The following is illustrative of the invention in one form and is not to be construed as limiting in any manner.

DESCRIPTION OF THE PREFERRED EMBODIMENT

Figure 3:
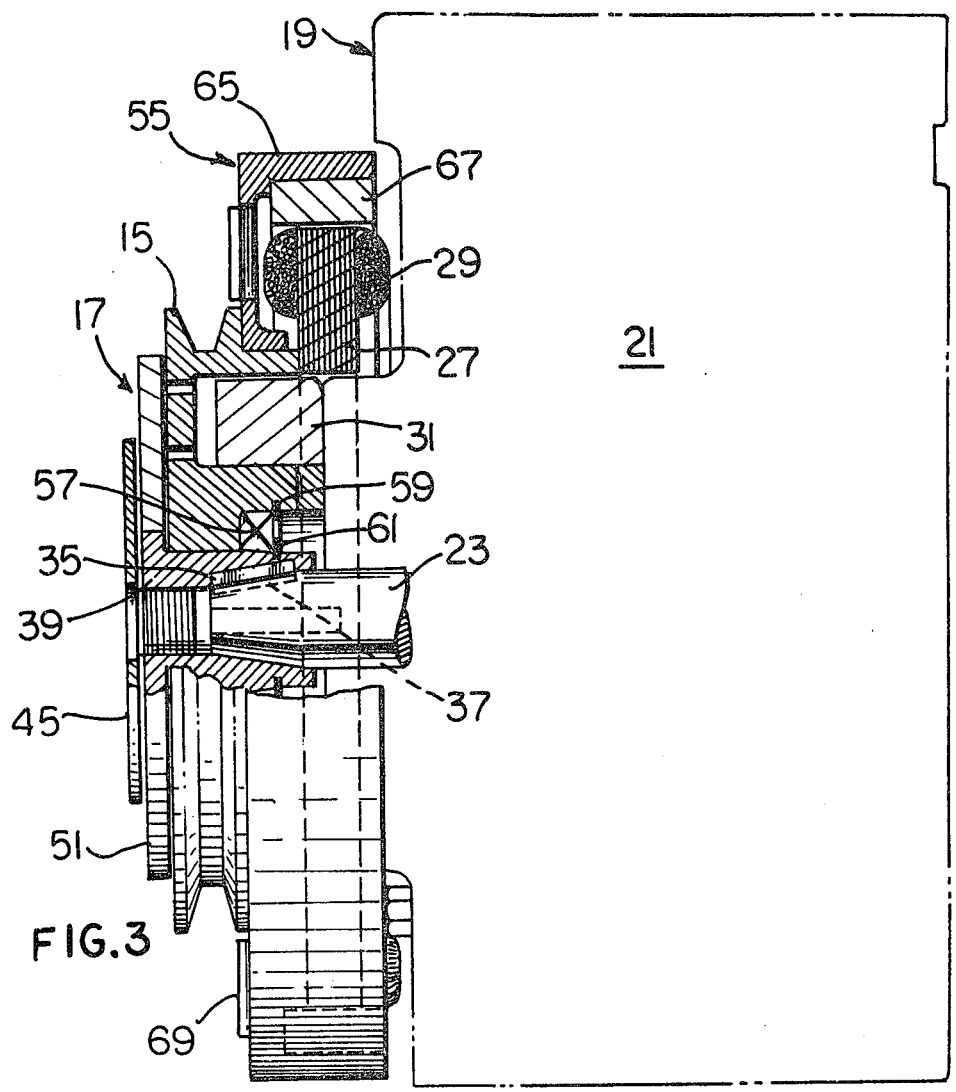
FIG. 3 is a side view partially in cross-section of the electromechanical device of FIG. 1.

In a vehicle the prime mover, such as an internal combustion engine, has pulley 11 driven, for example, by the engine crank shaft, and in FIG. 1 that pulley is coupled by way of V-belt 13 to drive another pulley 15 whenever the engine is running. Pulley 15 drives the alternator of the present invention whenever the engine is running, and when clutch arrangement 17 is actuated, also drives in air conditioner compressor 19. Three leads 20, 22 and 24 extend from Delta connected alternator phase windings and a clutch energizing or controlled lead 26 extends from a clutch actuating electromagnet to a thermostat or control switch 32 for clutch control. The other clutch energizing lead may be grounded. Thus, FIG. 1 illustrates a unified pump-generator structure and such a combined arrangement provides a compressor function for a vehicle air conditioning system as well as a generator or alternator function for supplying the vehicle electrical needs. The detailed construction and operation of such a combined arrangement will be most easily understood by considering FIGS. 2 and 3 together.

The pump or compressor 19 has housing 21 from which there is axially extending a drivable compressor in a conventional manner. Housing 21 also has fixedly attached thereto an annular generator stator assembly 25 which comprises a slotted laminated magnetic core 27 having windings 29 disposed in the core slots. Still further housing 21 has affixed thereto annular coil 31 which when energized creates a magnetic field to actuate clutch 17. Shaft 23 may be thought of as rotating about imaginary axis 33 and the annular coil 31 as well as the generator stator assembly 25 are attached to housing 21 concentric to one another and to axis 33. Similarly, these last two annular members are concentric with compressor crank shaft 23.

Shaft 23 is fixed, for example, by key 35 in keyway 37, by threading, or both, to member 39. Such threaded attachment may be facilitated by nut 41 and threads 43 on the compressor crank shaft. Still further, fixedly connected to member 39 and spaced therefrom is clutch support plate 45. Clutch support plate 45 may be connected to member 39, for example, by bolts or rivets 47, and this bolt or rivet 47 may also affix one end of spring 49 to the clutch support plate. As illustrated three such springs 49 have their ends remote from the bolts or rivets 47 connected to clutch plate 51. If shaft 23 is rotationally motionless so are member 39, clutch support plate 45, leaf springs 49 and clutch plate 51.

However, clutch plate 51 may move axially somewhat due to the flexing of springs 49 when the annular coil or clutch actuating coil 31 is energized. Energizing coil 31 draws clutch plate 51 axially toward side surface 53 of pulley 15 frictionally to engage surface 53 thereby connecting rotatable member 55 to compressor crank shaft 23. When coil 31 is deenergized, for example, by a manual or thermostatic control (not shown), clutch plate 51 under the influence of springs 49 returns to its rest position and no longer frictionally engages surface 53. In this rest position compressor 19 is inactive, however, rotatable member 55 free wheels about the axis 33 on a bearing 57.

Rotatable member 55 includes not only pulley 15, but also bearing retainer spring 59, and generator rotor portion 63, which includes flywheel 65 and a series of permanent magnets 67, which together form a multipole rotor for the alternator. Flywheel 65 may have the permanent magnets 67 adhesively bonded to its interior rim. Flywheel 65 and its permanent magnets 67 are again concentric within reasonable limits with axis 33. Flywheel 65 may be provided with a plurality of air passing apertures 69 for cooling the generator stator portion. A cooling fan may be mounted on member 65 to force air through holes 69 for applications in which the vehicles main cooling fan is not favorably located with respect to this alternator. The air passing apertures have webs lying therebetween and these web portions may be bent to form a fan type structure.

When the fixed annular coil 31 is not energized to create a magnetic field, clutch 17 is motionless and the compressor 19 is quiescent, even though the engine is operating and driving belt 13, to cause pulley 15, retainer 59, flywheel 65, and its associated permanent magnets 67 to rotate about the stator 25 and induce a voltage in the windings thereof. Energization of the coil 31 causes clutch plate 51 to engage surface 53 of pulley 15 and additionally, frictionally to drive clutch 17. and compressor crank shaft 23.

Axial space saving is accomplished by the nesting of generator and compressor portions which is most readily seen in FIG. 3. Thus generator elements, such as the permanent magnets 67 and stator 25, including stator laminations 27 and windings 29, are nested with and overlap somewhat magnetic clutch actuating coil 31 as well as bearing 57 and shaft engaging member 39. A substantial space saving and weight saving over merely an end to end connection of a generator and compressor is thereby achieved. It will be understood that electromagnets energized through slip rings on member 39 may be substituted for permanent magnets 67.

While many winding arrangements could be employed in the annular stator assembly 25, typical known alternators employ windings connected in a three-phase wye or star configuration with an ungrounded center point of that wye. Six diodes are employed to couple such a wye connection to, for example, a vehicle storage battery with three of those diodes conducting current from one terminal of the battery to each of the three respective winding leads while three other diodes couple those same three respective winding leads to the other side of the battery. Such a known winding connection would be perfectly suitable for use in the present invention, however, FIG. 4 illustrates another manner in which the windings may be connected and which connection may be preferred in some vehicle environments.

Figure 4:
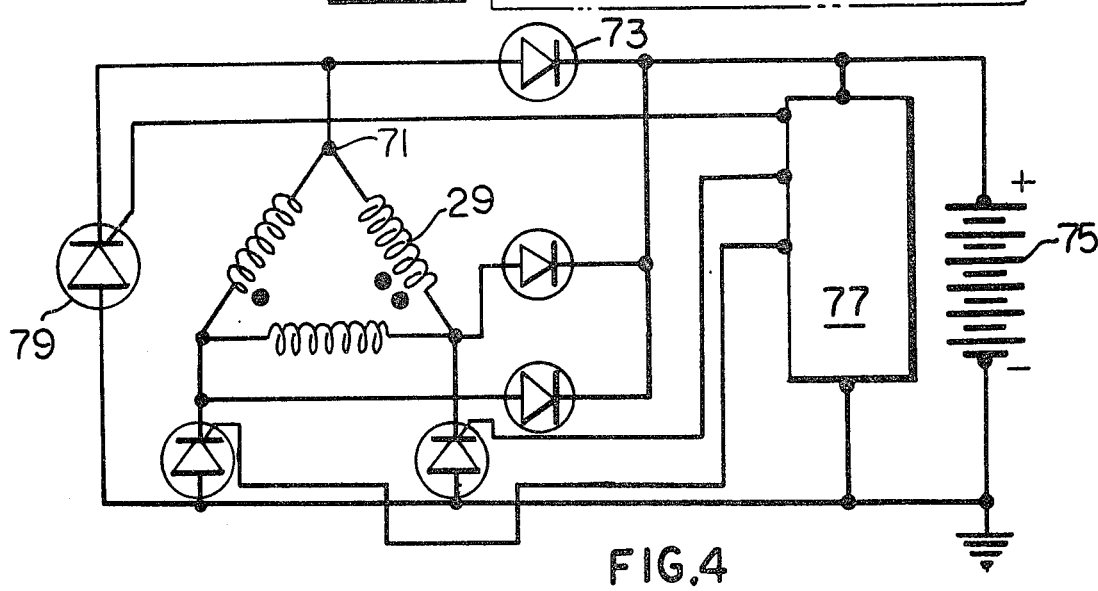
FIG. 4 is an electrical schematic diagram partially in block form illustrating one electrical arrangement for the alternator of the present invention.

In FIG. 4, the three windings 29 are Delta connected with each winding junction, such as 71 coupled by way of a diode 73 to the positive terminal of storage battery 75. Voltage regulating circuit 77 may sense the voltage across the battery and provide appropriate gating signals to silicon controlled rectifiers, such as 79, so as to pass or block charging current, depending upon the state of charge of the battery 75.

Figure 5:
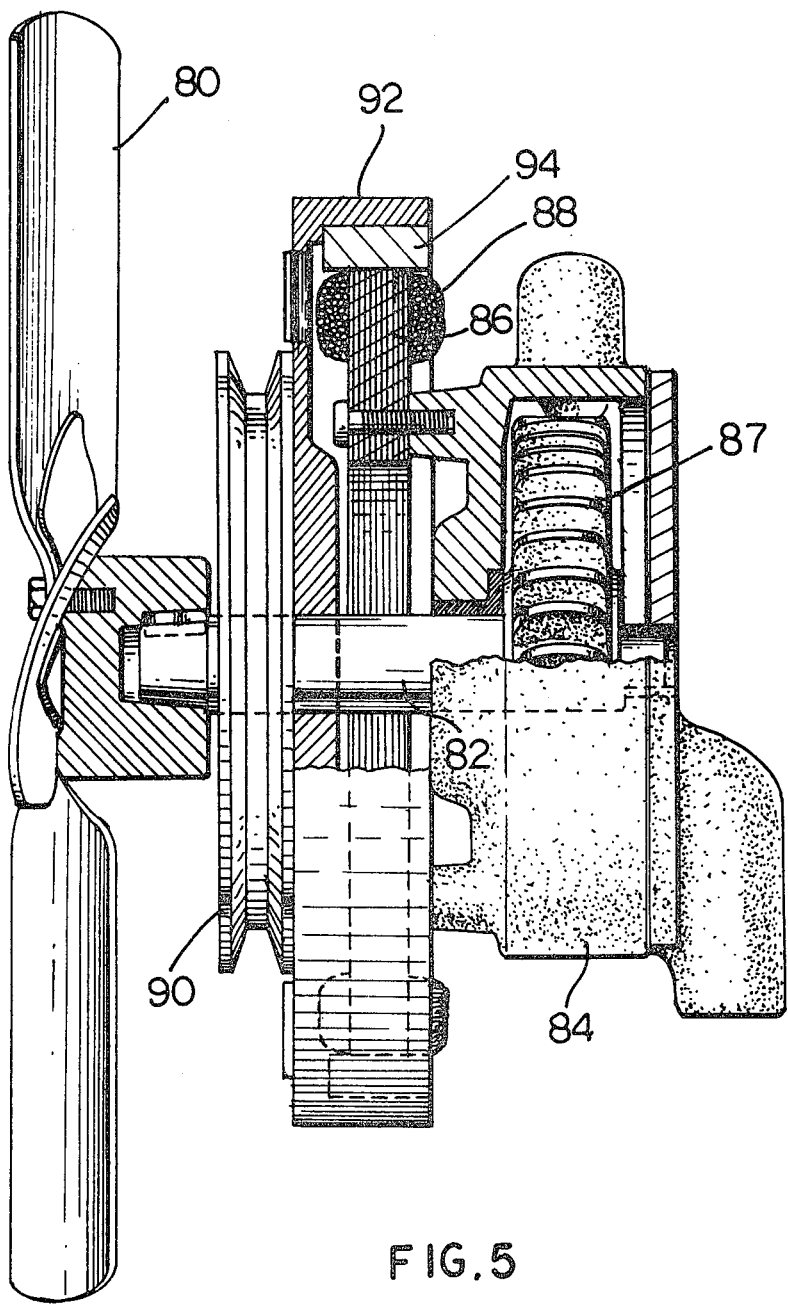
FIG. 5 is a side view partially in cross-section of a variation on the electromechanical device of the present invention.

In FIG. 5 a fan blade 80 is supported on a shaft 82 connected to a pump 84 such as a vehicle water pump having an impeller 87. Frame 84 of the water pump supports stator laminations 86 having windings 88 disposed therein. A pulley 90 is engine driven and in turn drives a flywheel 92 supporting permanent magnets 94 to provide a generator or alternator operating substantially as previously described. Mounting the alternator directly behind the vehicle cooling fan in this manner allows excellent cooling of the alternator windings, silicon controlled rectifiers and diodes. The alternator rotor is common with the vehicle fan and water pump shaft.

Thus, while the present invention has been described with respect to a specific preferred embodiment, numerous modifications will suggest themselves to those of ordinary skill in the art. For example, the illustrated preferred embodiment is of an alternator compressor, however, pumps found in vehicles other than an air conditioner compressor pump might equally well be integrated with an alternator, or other type generator advantageously according to the principles of the present invention. Also a bracket may support the alternator when no compressor is present. Accordingly, the scope of the present invention is to be measured only by that of the appended claims.

What is claimed is:

1. A unified compressor-generator assembly for a vehicle engine comprising:
   compressor means for compressing refrigerant in an automobile air conditioning system including a housing having an end face and a rotatable driving shaft extending from said end face;
   a hub member rotatably supported on said shaft and adapted to be driven by said engine to rotate about said shaft;
   a flywheel connected to said hub member and rotatable therewith, said flywheel having an annular flange portion at the periphery thereof adjacent said housing end face, said flange portion having a support surface concentric with said shaft;
   generator rotor elements supported on said support surface of said flywheel flange portion;
   a generator stator assembly supported on said housing end face concentrically within said rotor elements and surrounding said shaft; and
   selectively actuable clutch means for drivingly coupling said hub member to said shaft, said clutch means including a portion fixedly secured to said shaft and rotatable therewith, a clutch plate adapted drivingly to engage said hub member, and a coil concentrically surrounding said hub member and adapted when energized to urge said clutch plate into driving engagement with said hub member.

2. The structure of claim 1 wherein the rotor elements include permanent magnet means for providing a rotating magnetic field.

3. The structure of claim 1 wherein the stator assembly includes a slotted laminated magnetic core and windings disposed in the core slots.

4. The structure of claim 1 wherein the rotatable hub member includes a pulley for coupling the generator rotor to a prime mover.

5. The structure of claim 1 wherein the rotatable hub member is provided with a plurality of air passing apertures for cooling the generator stator assembly.

6. A unified pump-generator for a vehicle engine comprising:
   a pump including a housing having a face, pump bearings supported in the housing and a rotatable driving shaft journaled in the pump bearings and extending from said housing face;
   a rotatable hub member supported on said shaft for rotation about said shaft;
   a generator stator mounted on and supported solely by said housing face, said stator positioned in close proximity to said housing face; and
   a generator rotor fixedly secured to said hub member, the hub member and generator rotor rotatably supported by the pump bearings, said rotor positioned in close proximity to said housing face, radially outward of the stator and concentric with said shaft.

7. The assembly of claim 6 wherein said driving shaft includes clutch means for starting said pump independently of said generator.

8. The assembly of claim 7 wherein said rotor surrounds said stator assembly, said clutch means including an operating coil concentrically surrounding said shaft, said stator assembly concentrically surrounding said coil.

9. The assembly of claim 8 wherein said clutch means includes clutch plate means for drivingly engaging said driving connecting means in response to energization of said coil, said clutch plate means being connected to said shaft and rotatable therewith.

10. The assembly of claim 6 wherein the pump comprises a water pump.

11. The assembly of claim 6 further comprising a vehicle fan supported on the driving shaft for rotation therewith.

* * * * *